United States Patent [19]

Goepel

[11] Patent Number: 5,023,942
[45] Date of Patent: Jun. 11, 1991

[54] FAULT TOLERANT DATA TRANSMISSION NETWORK

[75] Inventor: Charles A. Goepel, Severna Park, Md.

[73] Assignee: Martin Marietta, Bethesda, Md.

[21] Appl. No.: 66,500

[22] Filed: Jun. 26, 1987

[51] Int. Cl.$^5$ .......................................... H04B 10/16
[52] U.S. Cl. .................................................. 455/601
[58] Field of Search ............... 455/600, 601, 610, 612, 455/7, 8, 14; 333/100, 124, 136; 330/151; 375/3.1, 4; 320/13.1; 350/96.16

[56] References Cited

U.S. PATENT DOCUMENTS

| | | | |
|---|---|---|---|
| 3,794,935 | 2/1974 | Tsuchiya et al. | 330/151 |
| 3,891,804 | 6/1975 | Hachenburg | 179/15 AL |
| 3,943,358 | 3/1976 | Reymond et al. | 250/199 |
| 4,072,399 | 2/1978 | Love | 350/96.16 |
| 4,074,127 | 2/1978 | Mochida et al. | 250/199 |
| 4,112,293 | 9/1978 | Kach | 350/96.16 |
| 4,148,558 | 4/1979 | Schuck | 350/96.20 |
| 4,166,946 | 9/1979 | Chown et al. | 350/96.16 |
| 4,245,886 | 1/1981 | Kolodzey et al. | 350/96.20 |
| 4,249,266 | 2/1981 | Nakamori | 455/608 |
| 4,252,402 | 2/1981 | Puech et al. | 350/96.14 |
| 4,257,124 | 3/1981 | Porter et al. | 455/601 |
| 4,261,641 | 4/1981 | Porter | 350/96.16 |
| 4,306,313 | 12/1981 | Baldwin | 455/601 |
| 4,306,314 | 12/1981 | Griffiths | 455/603 |
| 4,316,141 | 2/1982 | Adolfsson et al. | 455/612 |
| 4,317,218 | 2/1982 | Perry | 455/54 |
| 4,317,614 | 3/1982 | Palmer | 350/96.16 |
| 4,337,995 | 7/1982 | Tanaka et al. | 350/96.20 |
| 4,380,738 | 4/1983 | Wagner | 330/151 |
| 4,406,513 | 9/1983 | Raphael | 350/96.16 |
| 4,430,699 | 2/1984 | Segarra et al. | 350/96.16 |
| 4,435,849 | 3/1984 | Ilgner et al. | 455/601 |
| 4,449,782 | 5/1984 | Korth | 350/96.16 |
| 4,452,507 | 6/1984 | Winzer | 350/96.20 |
| 4,457,581 | 7/1984 | Johnson et al. | 350/96.16 |
| 4,501,021 | 2/1985 | Weiss | 455/601 |
| 4,517,456 | 5/1985 | Halsall et al. | 250/266 |
| 4,545,074 | 10/1985 | Balliet et al. | 455/601 |
| 4,564,293 | 1/1986 | Newton et al. | 356/350 |

OTHER PUBLICATIONS

Albanese, A., "Fail-Safe Nodes for Lightguide Digital Networks", The Bell System Technical Journal, Feb. 1982, pp. 247-256.

Primary Examiner—Reinhard J. Eisenzopf
Assistant Examiner—L. Van Beek
Attorney, Agent, or Firm—Staas & Halsey

[57] ABSTRACT

A data transmission system, in which a plurality of repeater nodes are interconnected by optical fiber or electrical transmission links, which has a predetermined bypass path split ratio and does not require an automatic gain control circuit. Each node includes an electrical splitter at its input, an active branch including a receiver and a transmitter, and a passive branch which bypasses the active path. The active and passive branches are joined at the output of the node by an electrical combiner. By choosing the splitting ratio of the electrical splitters to have approximately a 70/30 split, with 70% going to the active branch and 30% going to the passive branch, a $10^{-9}$ bit error rate is readily achievable.

27 Claims, 6 Drawing Sheets

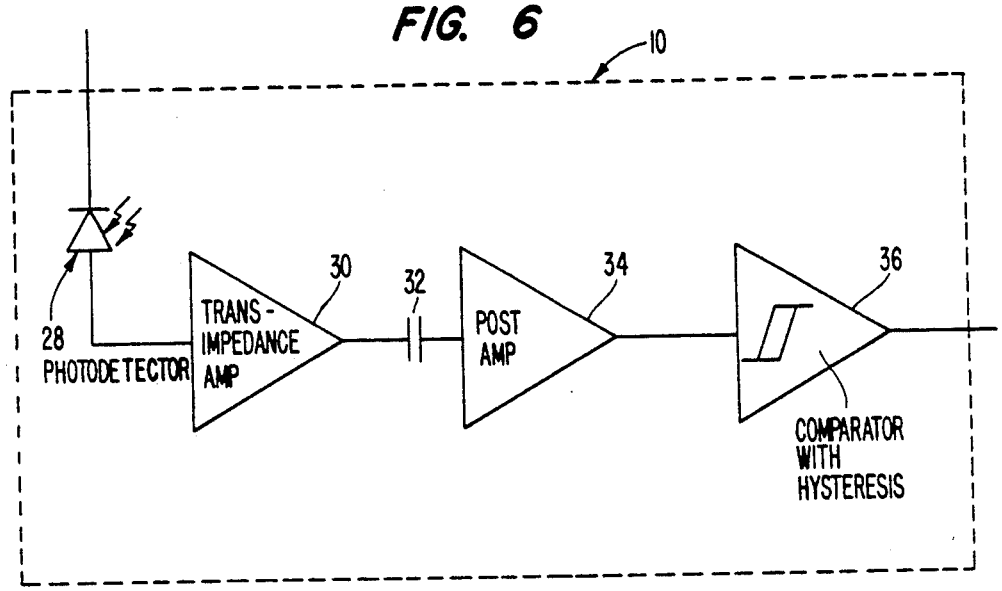
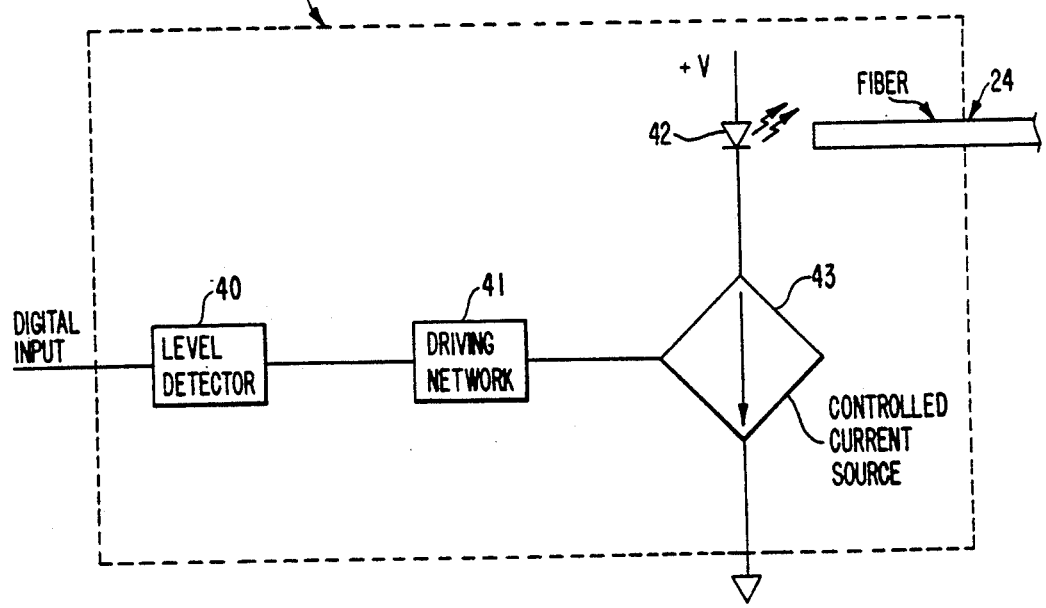

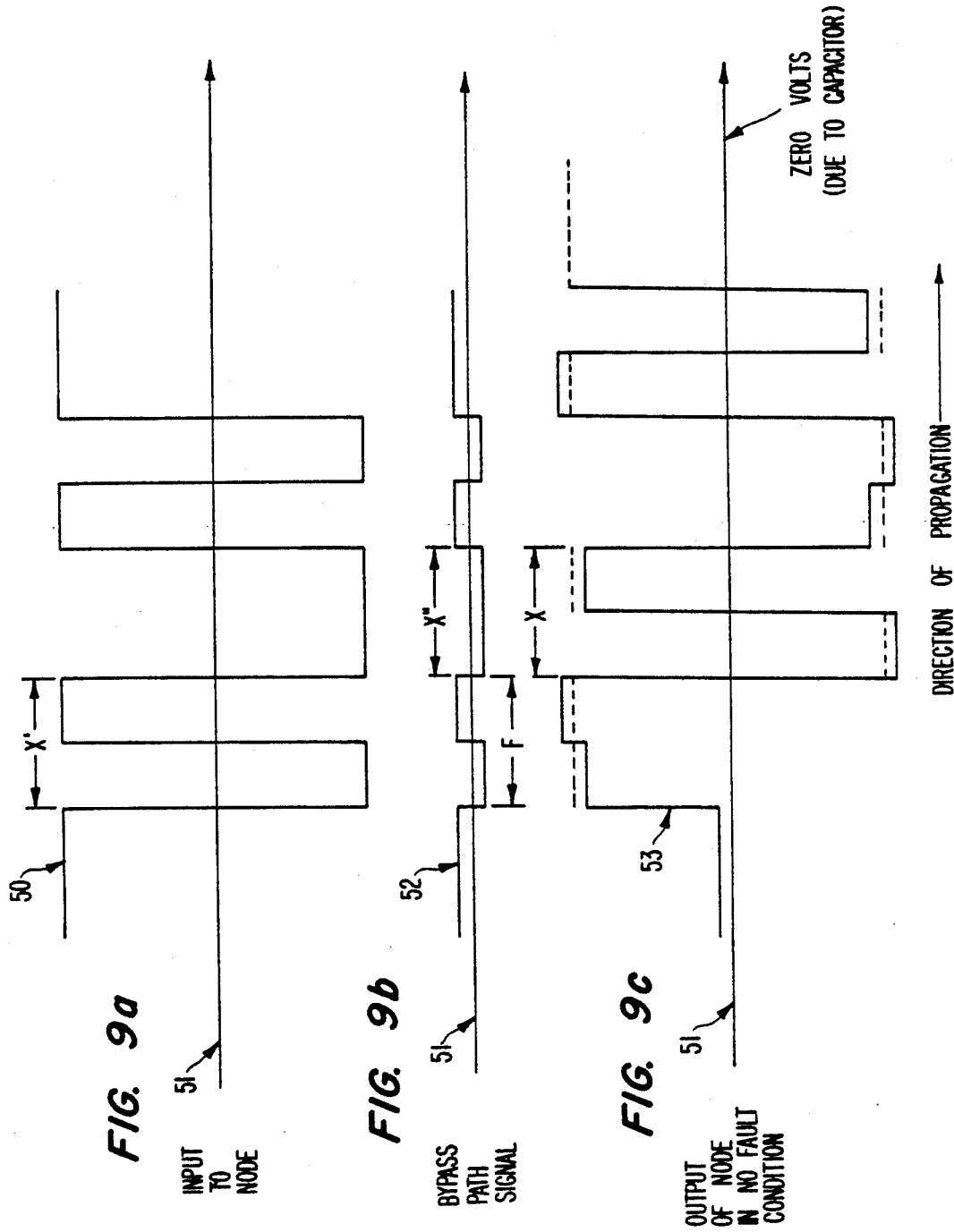

5,023,942

FAULT TOLERANT DATA TRANSMISSION NETWORK

BACKGROUND OF THE INVENTION

1. Field of the Invention

This invention relates to a data transmission system in which a plurality of repeater nodes are interconnected by transmission links and, more particularly, to a system that has a predetermined bypass path split ratio and does not require an automatic gain control circuit.

2. Description of the Related Art

Fault tolerant systems for data transmission systems are known in the art. Conventional methods for providing fault tolerant systems include methods which bypass the main transmission path utilizing a bypass switch which, upon failure at a node, will allow a bypass around the failed node. Another method utilizes parallel redundant transmission equipment, thereby allowing use of a secondary system when a primary system fails. Chown et al., U.S. Pat. No. 4,166,946, teaches a data transmission system utilizing optical fibers in which an optical fiber bypass arrangement is provided in the event of a repeater node failure. In each of the above systems, the main signal input into the repeater is boosted and sent further down the line. This boosting is needed to cure the effect of signal degradation as the signal travels over the transmission line.

FIG. 1 is a graph conceptually showing how a repeater of the prior art affects a signal applied to its input. As shown in FIG. 1, a digital signal (line A), which has degraded due to propagation losses, is applied to the input. In the repeater, the signal is boosted by adding to the input signal (portion C in FIG. 1), thus raising the amplitude of the signal so that it is output as shown by dotted line B. A major problem in implementing such a boosting scheme is the accuracy by which the boosted signal is added to the original signal. Also, an optically incoherent boost scheme cannot improve the accumulation of pulse dispersion.

SUMMARY OF THE INVENTION

It is an object of the present invention to provide a data transmission system having a plurality of repeater nodes interconnected by optical fiber or electrical transmission links, which can, even in the event of failure of one or more repeater nodes, still transmit data between the remaining functioning repeater nodes.

Another object of the present invention is to provide a data transmission system having a plurality of repeater nodes interconnected by optical fiber or electrical transmission links, in which each repeater node recreates or re-transmits a signal based upon the signal applied to its input.

An additional object of the present invention is to provide a data transmission system in which a plurality of repeater nodes are interconnected by optical fiber or electrical transmission links and in which the repeater nodes do not require an automatic gain control circuit.

A further object of the present invention is to provide a repeater in which a signal applied to the repeater's input is retransmitted at an improved level.

According to the present invention, there is provided a data transmission system comprising a plurality of repeater nodes coupled to each other via signal transmission cables. Each node includes a signal splitter at its input, an active branch including a receiver and a transmitter, and a passive branch including a signal transmission cable coupled to the signal splitter. The passive branch is terminated at a signal combiner located at the output of the repeater node. The transmitter of the active branch is also coupled to the signal combiner. The splitters are chosen so that a signal across the passive branch is equal to 1/12 of the signal on the main or active line. By so choosing the splitting ratios, a $10^{-9}$ bit error rate is readily achievable. An automatic gain control circuit is not needed and at least two successive nodes can fail without system degradation.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a block diagram of an optical receiver according to a preferred embodiment of the present invention;

FIG. 8 is a block diagram of a transmitter according to a preferred embodiment of the present invention; and FIG. 9, including 9a-9c, are graphs of signals across the fault tolerant network of the present invention.

DESCRIPTION OF THE PREFERRED EMBODIMENT

Figure 1:
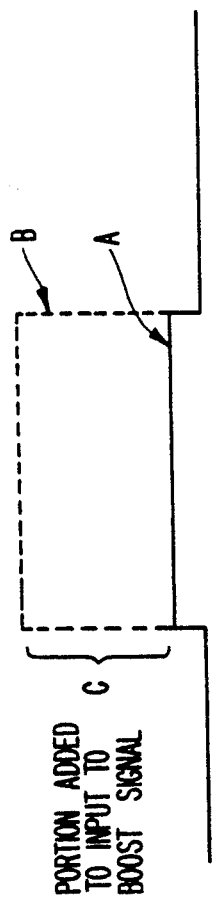
FIG. 1 is a graph showing the effect of a repeater of the prior art on an input signal.
Figure 2:
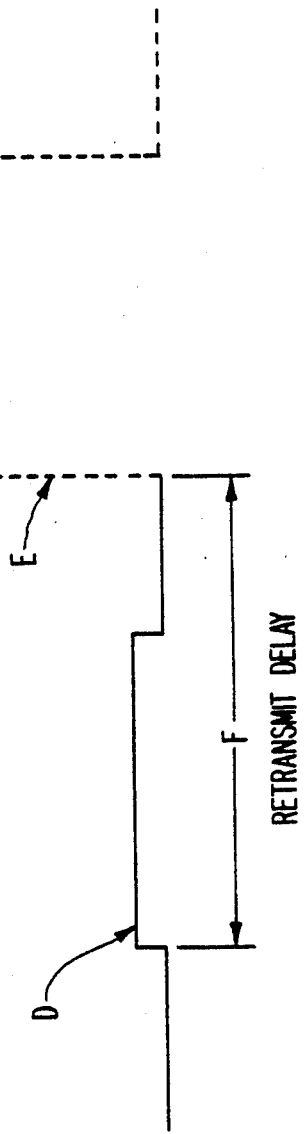
FIG. 2 is a graph showing the effect of a repeater of the present invention on an input signal.

FIG. 2 is a graph conceptually showing the effect of a repeater according to the present invention on an input signal. According to the present invention, the repeater receives a signal (line D) at its input. Rather than adding to the input signal to increase its amplitude, the present invention "retransmits" a new signal (dotted line E) which is the input signal delayed in time and at the transmit level for the system.

Figure 3:
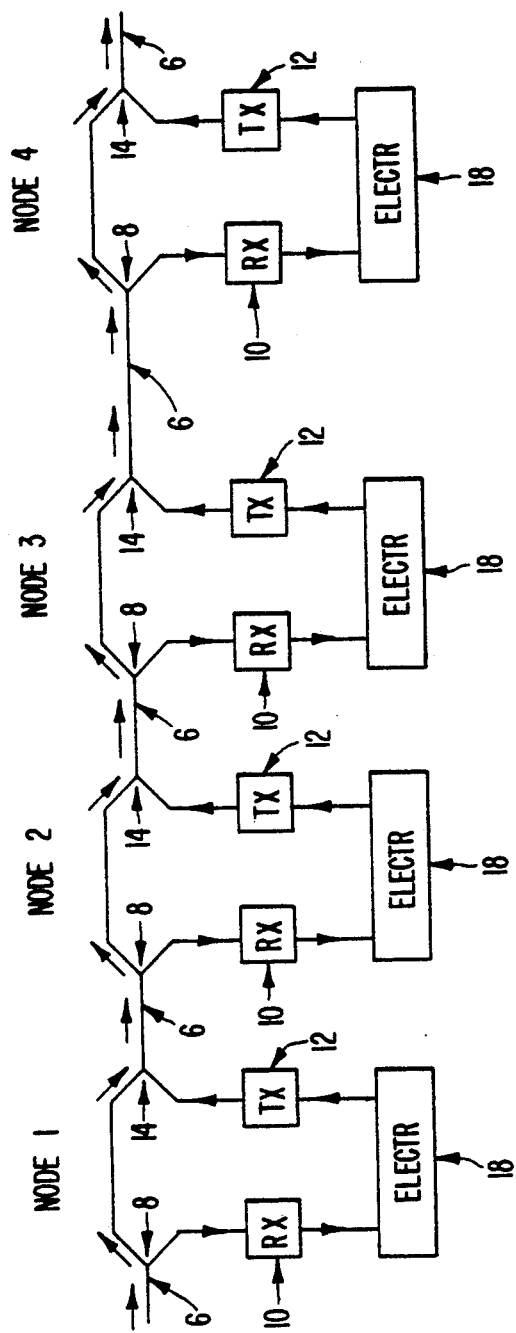
FIG. 3 is a block diagram of a fault tolerant network according to a preferred embodiment of the present invention.

FIG. 3 shows a network for transmission of digital information which can bypass field repeater nodes without the use of optical or mechanical switching, according to a preferred embodiment of the present invention. The system includes a fiber optic data transmission line 6. Along the optical fiber transmission line 1, several repeater nodes are dispersed. FIG. 3 shows four such repeater nodes, node 1, node 2, node 3 and node 4. Each node includes a directional fiber optic splitter 8 at its input, an optical receiver 10 which receives approximately 71% of the input signal, an optical transmitter 12 which retransmits the input signal, and a directional fiber optic combiner 14 on the output side that combines the bypass path signal and the retransmitted signal. The optical splitter 8 and conbiner 14 are preferably identical.

Figure 4:
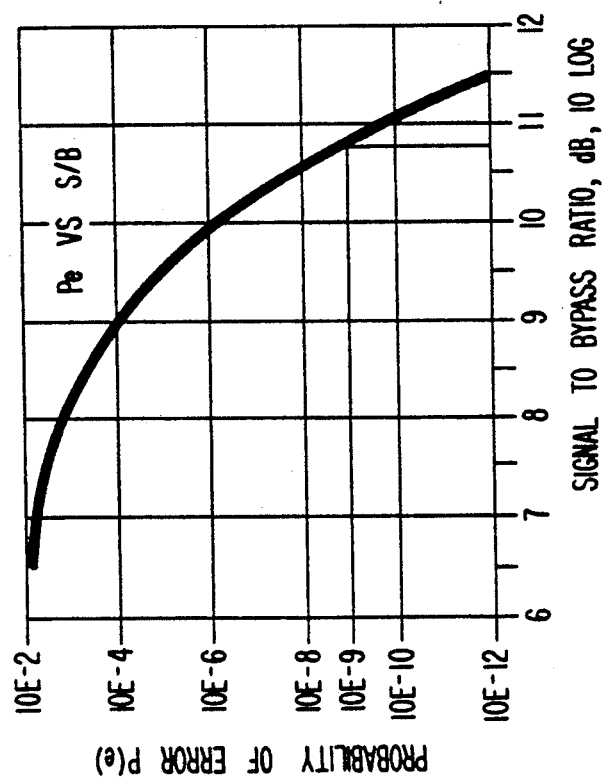
FIG. 4 is a graph of the Probability of Error vs the Signal to Bypass Ratio according to the present invention.

FIG. 4 is a graph of the Probability of Error vs Signal to Bypass ratio for the optical receiver of each of the nodes in the system. As indicated by the curve, to achieve a preferred $10^{-9}$ bit error rate, which is normally considered an error free transmission, a signal to bypass ratio of 10.7 dB is required. When a coupling ratio is chosen so that the bypass signal is 1/12 of the main signal, the above $10^{-9}$ bit error rate is readily achievable. As can be seen from the graph bypass ratios, less than the preferred ratio will produce an acceptable signal if a higher error rate is permitted. The preferred range of bypass to signal ratios is from 3 dB to 13 dB.

Figure 5:
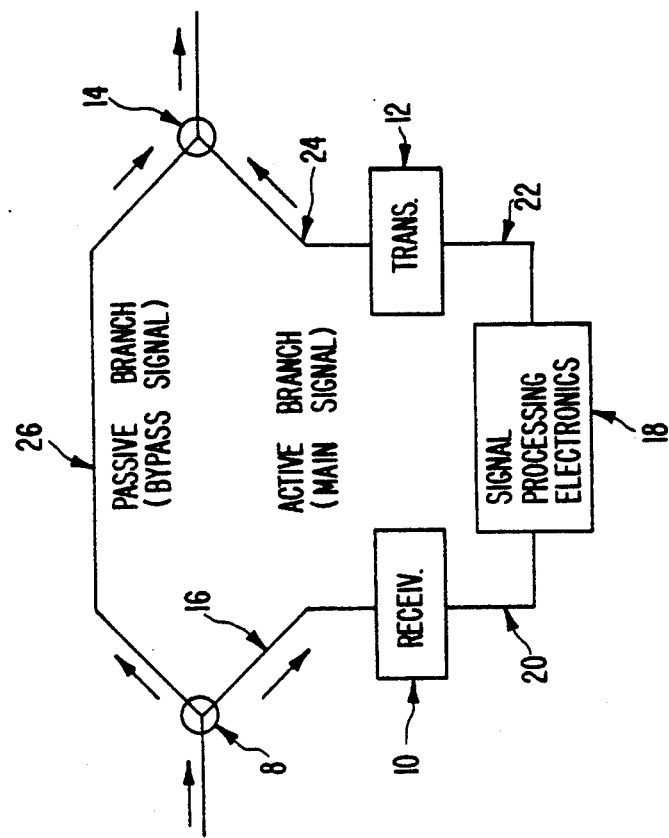
FIG. 5 is a block diagram of one of the nodes of the network of FIG. 3 according to a preferred embodiment of the present invention.

FIG. 5 is a detailed drawing of one of the nodes. An optical fiber 16 couples the receiver 10 to the fixed split ratio directional fiber optic splitter 8, available from Gould, Inc. as part number 1300-SM-71/29. The signal processing electronics 18 are electrically coupled to the receiver 10 and the transmitter 12 via wires 20 and 22. The signal processing electronics are used to add local data input to the transmission line, if desired. If the node is only to be used as a repeater, the signal processing electronics can be omitted, and receiver 10 can be directly coupled to transmitter 12 via wire 20 or wire 22. The transmitter 12 is coupled via optical fiber 24 to the directional fiber optic combiner 14 also, available from Gould, Inc. as part number 1300-SM-71/29. This path, which flows from the directional fiber optic splitter 8 through the receiver 10, is the active branch. The active branch carries the main signal when the fault tolerant fiber optic network is functioning normally. An optical fiber 26 coupled between the directional fiber optic splitter 8 and the directional fiber optic combiner 14 provides the passive branch which carries the bypass signal which is preferably at 1/12 the amplitude of the signal received by the receiver 10.

FIG. 6 is a block diagram of receiver 10 for the repeaters of the present invention. In FIG. 6, a photodetector 28 is coupled to a transimpedance amplifier 30. The photodetector 28 and the transimpedance amplifier 30 are matched. For example, if a PIN detector is used for the photodetector, a very high gain transimpedance amplifier should be used to compensate for the low gain of the PIN detector. The type of photodetector used does not matter as long as the photodetector and the transimpedance amplifier are matched. It is very important that the dynamic range of the detector 28/amplifier 30 be at least 30 dB, so that at least two nodes can be bypassed before the signal degrades past the point of detection. A dynamic range of 40 dB is preferred. An RCA CA30902E avalanche photodetector used with a Signetics NE 5212 transimpedance amplifier is an appropriate matched pair.

Following the transimpedance amplifier 30, a coupling capacitance 32 is inserted, providing AC coupling, and is followed by a high gain post amplifier 34 such as a Signetics SE592. The coupling capacitance 32 is used so that the post amplifier 34 does not amplify any DC drift associated with any of the previous stages, for example, from the transimpedance amplifier. By using this coupling capacitance, along with the signal to bypass ratio discussed herein, is not necessary to use an automatic gain control.

Figure 7:
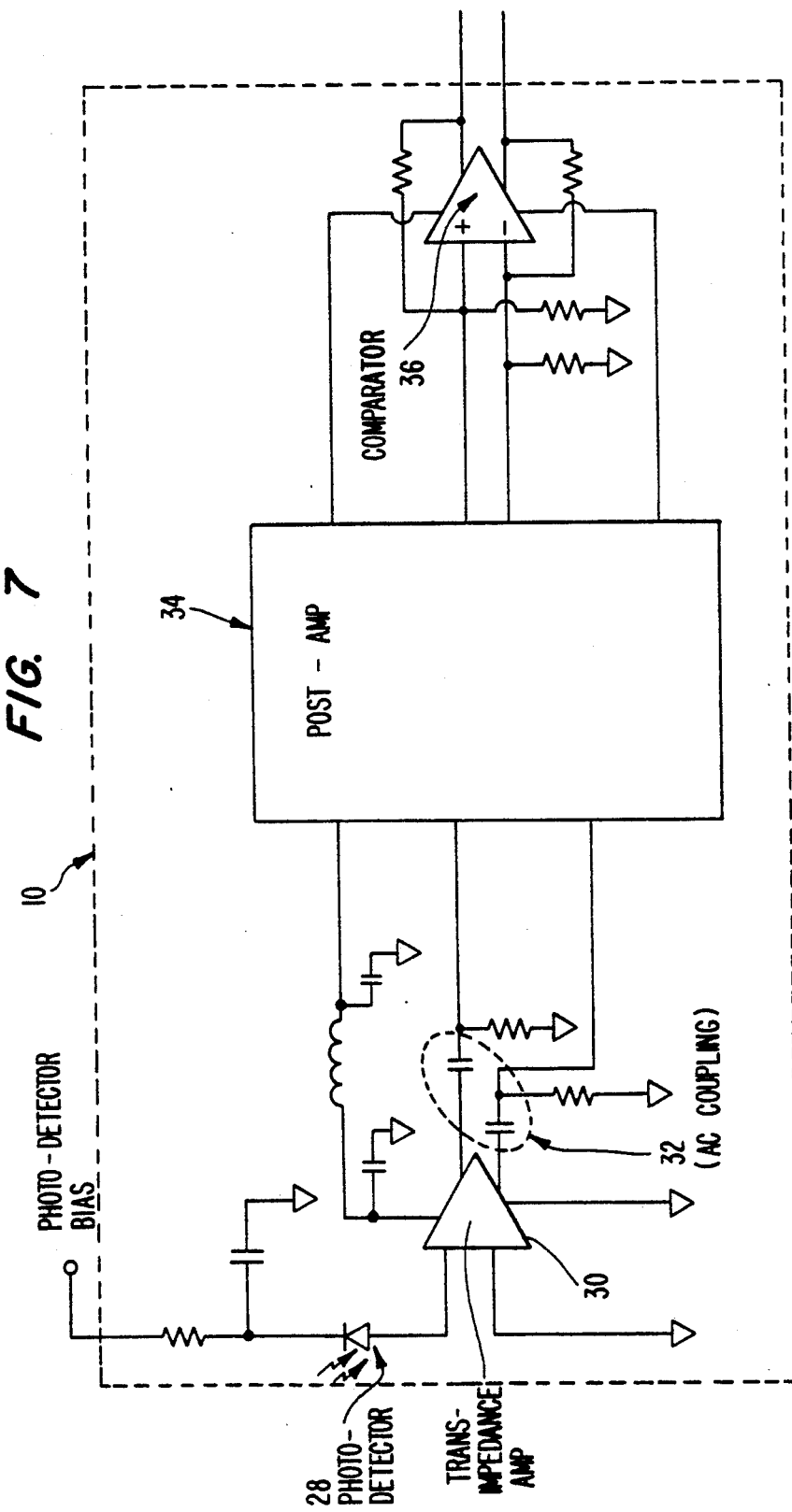
FIG. 7 is a schematic drawing of a receiver according to a preferred embodiment of the present invention.

After passing through the coupling capacitance 32, and the post amplifier 34, the signal is then sent into a comparator 36 that has a hysteresis characteristic, such as a National LMb 360. The hysteresis feature is important in optical receiver design because the resistors associated with a transimpedance amplifier produce inherent noise which can be amplified hundreds of times. Accordingly, the comparator 36 must receive a signal with positive and negative threshold values. The comparator threshold has to be above the intrinsic noise of the system created by the transimpedance amplifier and any noise created by the photodetector. FIG. 7 is a more detailed schematic diagram of the above-described receiver 10.

FIG. 8 is a block diagram of a transmitter 12 for the repeaters of the present invention. The transmitter is a high output type transmitter. Preferably, the transmitter 12 will have an optical power level of approximately −8 dBm. In order to operate with two contiguous node failures, the transmitter's output requirement must be at least 30 dB higher than the dynamic range of the receiver associated with it. A transmitter having the above specifications is available from Advance Fiber Optics.

Referring to FIG. 8, a digital input, such as a TTL level signal, is input, and the transmitter 12 creates an optical replica of the digital input signal. If it receives a digital 1, it optically creates, or retransmits, a digital 1. An optically created digital 1 is transmitted by lighting an LED 42, while an optically created digital 0 is transmitted when the LED 42 is not lit. In the transmitter 12, a level detector 40 gets rid of any input noise on the digital input signal. The output of the level detector 40 is applied to a driving network 41 which scales the electrical digital 1's and 0's applied to a controlled current source 43. The driving network 41 and controlled current source 43 form an analog stage, in which a variable output current is produced. A current above the threshold level of the LED 42 indicates a digital 1, or ON state, and a current level below the threshold level of the LED 42 indicates a digital 0, or OFF state. The output of the LED 42 is applied to the optical fiber 24.

The directional fiber optic splitters 8 allow a portion of the received signal to bypass the node via the passive branch 26. By building the splitter 8 with a split ratio such that 71% of the energy goes to the active branch while 29% of the energy goes to the passive branch and the combiner 14 with a corresponding combining ratio, a signal to bypass ratio of 12 to 1 can be achieved. When operating normally, any bypass signal going across the passive branch of node 1 is treated by the next receiver in the string (the receiver of node 2 in this example) as noise. This is because the data stream from the optical transmitter of node 1 overwhelms the bypass signal.

FIG. 9 is a signal diagram of signals passing through a node of the present invention. FIG. 9a shows a data stream as input to the splitter and receiver of a properly functioning node. Line 51 represents a reference level for the data. For a fiber optic system, the references level 51 represents the level of light intensity at which a transition between a digital 1 and digital 0 occurs. For an electrical data transmission system, line 51 represents the level of the electric signal at which a transition between a digital 1 and digital 0 occurs. Line 50 is the signal applied from a previous repeater or from a data input terminal. FIG. 9B shows the signal carried by the passive or bypass path, identified by line 52. The signal across the bypass path is, in this example, approximately 1/12 the value of the signal input to the repeater. FIG. 9C shows the outputs of the combiner 14, which represents the two signals of 9A and 9B superimposed upon each other (line 53) with a retransmit delay F caused by the retransmission electronics. The delay has been exaggerated for ease of explanation. The signal across the bypass path is ahead of the signal across the active branch due to the delay caused by the components of the active branch. Thus, the portion labeled x in FIG. 9C consists of the portion x' of FIG. 9a combined with the portion x" of FIG. 9b. The slight value added to or subtracted from the retransmitted signal due to the bypass signal is so small that it is perceived as noise by subsequent repeaters.

When the active path of a repeater node of the present invention is experiencing a fault, for example, a failure of the receiver and/or transmitter, the 1/12 signal shown in FIG. 9b is output at the combiner 14 of the failed node and continues on to the next repeater in line. When the dynamic range of the receivers 10 of the repeaters is at least 30 dB, the receivers 10 are able to receive a signal across at least two failed nodes, and the properly functioning repeater retransmits the signal at the correct level.

As noted above, the dynamic range of the receiver 10 is chosen so that each receiver 10 can receive the bypass signal bypassed across several nodes. In the failure mode, that is, in the event of receiver or transmitter failure in Node 1 of FIG. 3, the bypass signal is still within the dynamic range of the receiver of the second node 2, and thus the receiver of node 2 accepts the bypass signal. In this manner, the continuity of the network is retained.

During normal operation, receiver 10 of node 2 receives an optical signal from both the unamplified or bypass path of node 1 and the active retransmitted signal; however, because node 1 is functioning normally, the retransmitted signal from node 1 is twelve times as large as the bypass signal of node 1. Thus, the receiver of node 2 will recognize the bypass signal as noise and node 2 reproduces the signal from node 1 with a $10^{-9}$ error rate. A bit error rate at this level is considered virtually error free transmission.

In a conventional optical receiver, an optical signal representing a digital 1 must be of sufficient intensity to produce a photo-current level from the detector and the preceding amplifiers above a predetermined reference level. Light pulses with insufficient intensity to trip the comparator are assumed to be zeroes. To accomplish this task over a wide range of optical input intensities, an automatic gain control circuit raises the signal level, whether it is noise or the true signal, up to an absolute D.C. reference level proportional to the average value of the input optical intensity. The data signal then transitions around this D.C. level. Because of the inter-stage coupling capacitance 32 in the present invention the reference level 51 (see FIGS. 9a-9b) at the input to amplifier 34 is zero volts.

According to the present invention, signals above the reference or zero level represent a high state or digital 1. Signals below the reference level indicate a low state or digital 0. If the main signal is removed, as in the event of a repeater failure, the bypass signal, shown in FIG. 9b, is applied to the input of the next repeater in line. The bypass signal still transitions above and below the reference zero volt level. As shown in FIG. 9b, the automatic gain control is not needed because the bypass signal is transitioning across the zero level. Because the bypass signal is transitioning about the zero level, the bypass signal can be received by the receiver of a repeater several nodes down the line, as long as the signal is within the dynamic range of the receiver. In a four-node system, if the middle two nodes fail, the receiver in the last node in the line will receive the smaller bypass signal. The signal will be retransmitted by the repeater and continue down the line.

The system of the present invention can function as long as the signal to bypass ratio is at least 2. The preferred range for the absolute signal to bypass ratio is from 2 to 12, depending on the maximum dynamic range of the receiver. The preferred signal to bypass ratio, based on relative signal level, is from 3 dB to 13 dB, as illustrated in FIG. 4, with 10.7 dB being the ideal preferred ratio. 10.7 dB provides a signal to bypass ratio of 12 to 1. As the signal to bypass ratio gets larger, the system can bypass more and more repeaters. However, from a practical standpoint, the greater the signal to bypass ratio, the more optical energy is wasted and the amplifiers have to have a greater dynamic range. Large dynamic range amplifiers are very expensive. When a bypass ratio of 2 is used, the system neecs a separate parallel path for the clock signal or a pnase locked loop to remove the clock signal. Such a system could function with amplifiers of lower dynamic range and also bypass a greater number of failed nodes. Additionally, the distance between repeaters could be increased.

As noted above, the present invention is not limited to a fiber optic network. The system of the present invention can be implemented equally well utilizing electrical means, such as standard ooaxial cable, directional electrical splitters, and electrical receivers and transmitters.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

I claim:

1. A repeater for a fault tolerant data tarnsmission network receiving an input signal at a transmit level, comprising:

splitting means for splitting te input signal at a predetermined split ratio of 71 to 29 into an active path signal and a bypass path signal where 71% of the energy is routed to an active branch and 29% of the energy is routed to a passive branch;

retransmit means for retransmitting the active path signal at the transmit level; and combiner means for combining the retransmitted active path signal and the bypass path signal at a predetermined combining ratio producing an output signal having a $10^{-9}$ bit error rate.

2. A repeater as recited in claim 1, wherein the predetermined split ratio and the predetermined combining ratio produce a signal to bypass ratio in the range of from 3 dB to 13 dB.

3. A repeater as recited in claim 2, wherein the signal to bypass ratio is 10.7 dB.

4. A repeater as recited in claim 1, wherein said retransmit means includes a receiver amplifier with a dynamic range of at least 30 dB.

5. A repeater as recited in calim 4, wherein said retransmit means includes a capacitance connected to the receiver amplifier and a post amplifier connected to the capacitance.

6. A repeater as recited in claim 1, wherein said input signal is an optical signal.

7. A repeater as recited in claim 1, wherein said input signal is an electrical signal.

8. A repeater as recited in claim 1, wherein said retransmit means retransmits without automatic gain control amplification.

9. A fault tolerant fiber optic network, comprising:
a fiber optic line transmitting an optical data signal; and
repeater nodes, each having an input, an active branch and a passive branch, and each repeater cmoprising:
splitting means for splitting the signal to the active and passive branches of said repeater at the input at a 71 to 29 split ratio where 71% of the energy is routed to the active branch and 29% of the energy is routed to the passive branch;
receiving means coupled to said splitting means for receiving the active branch signal transmitted on the active branch and having a high dynamic range;
retransmit means, coupled to said receiving means, for retransmitting the active branch signal;
a bypass path, coupled to said splitting means, carrying the passive branch signal; and
combining means for combining the passive branch signal and the active branch signal producing an output signal having a $10^{-9}$ bit error rate.

10. A fault tolerant fiber optic network as claimed in claim 9, wherein said splitting ratio is such that the signal from the bypass path at the output of said combining means is 1/12 of the signal on the main fiber optic line.

11. A fault tolerant fiber optic network as claimed in claim 9, wherein each receiving means has a dynamic range sufficient to amplify the bypass signal bypassed through at least two contiguous failed nodes.

12. A fault tolerant fiber optic network as claimed in calim 9, wherein said combining means has a 71 to 29 combining ratio where 71% of the energy comes from said retransmit means and 29% of the energy comes from said bypass path.

13. A repeater as recited in claim 9, wherein said retransmit means retransmits without automatic gain control amplification.

14. A fault tolerant electrical network, comprising:
an electrical line transmitting an electrical data signal; and
repeater nodes, each having an input, an active branch and a passive branch, and each repeater comprising:
splitting means for splitting the signal to the active and passive branches of said repeater at the input and producing an active branch signal and a passive branch signal at a 71 to 29 spli ratio where 71% of the energy is routed to the active branch and 29% of the energy is routed to the passive branch;
receiving means coupled to said splitting means for receiving the active branch signal transmitted on the active branch and having a high dynamic range;
retransmit means, coupled to said receiving means, for retransmitting the active branch signal;
a bypass path, coupled to said splitting means, carrying the passive branch signal; and
combining means for combining the passive branch signal and the active branch signal producing an output signal having a $10^{-9}$ bit error rate.

15. A fault tolerant electrical network as claimed in claim 14, wherein each receiving means has a dynamic range sufficient to amplify the bypass signal bypassed through at least two contiguous failed nodes.

16. A fault tolerant electrical network as claimed in calim 14, wherein said splitting ratio is such that the signal from the bypass path at the output of said combining means is 1/12 of the signal on the main electrical line.

17. A fault tolerant electrical network as claimed in claim 14, wherein said said combining means has a 71 to 29 combining ratio where 71% of the energy comes from said retransmit means and 29% of the energy comes from said bypass path.

18. A repeater as recited in claim 14, wherein said retransmit means retransmits without automatic gain control amplification.

19. A repeater for a fault tolerant data transmission network receiving an input signal at a transmit level, comprising:
splitting means for splitting the input signal at a predetermined split ratio into an active path signal and a bypass path signal;
retransmit means for retransmitting the active path signal at the transmit level; and
combiner means for combining the retransmitted active path signal and the bypass path signal at a predetermined combining ratio where the predetermined split ratio and the predetermined combining ratio produce a bypass ratio of 10.7 dB producing an output having a $10^{-9}$ bit error rate.

20. A repeater as recited in claim 19, herein said retransmit means retransmits without automatic gain control amplification.

21. A repeater for a fault tolerant data transmission network receiving an input signal at a transmit level, comprising:
splitting means for splitting the input signal at a predetermined split ratio into an active path signal and a bypass path signal;
retransmit means for retransmitting the active path signal at the transmit level; and
combiner means for combining the retransmitted active path signal and the bypass path signal to produce a combined signal at a predetermined combining ratio where the split ratio is such that the bypass path signal at an output of said combiner means is 1/12 of the combiend signal producing an output having a $10^{-9}$ bit error rate.

22. A repeater as recited in claim 21, wherein said retransmit means retransmits without automatic gain control amplificaiton.

23. A repeater for a fault tolerant data transmission network receiving an input signal at a transmit level, comprising:
splitting means for splitting the input signal at a predetermined split ratio of approximately 71 to 29 into an active path signal and a bypass signal where approximately 71% of the energy is routed to an active branch and approximately 29% of the energy is routed to a passive branch;
retransmit means for retransmitting the active path signal at the transmit level; and combiner means for combining the retransmitted active path signal and the bypass path signal at a predetermined combining ratio.

24. A fault tolerant fiber optic network, comprising:
a fiber optic line transmitting an optical data signal; and
repeater nodes, each having an input, an active branch and a passive branch, and each repeater comprising:
  splitting means for splitting the signal to the active and passive branches of said repeater at the input at approximatley a 71 to 29 split ratio where approximately 71% of the energy is routed to the active branch and 29% of the energy is routed to the passive branch;
  receiving means coupled to said splitting means for receiving the active branch signal transmitted on the active branch and having a high dynamic range;
  retransmit means, coupled to said receiving means, for retransmitting the active branch signal;
  a bypass path, coupled to said splitting means, carrying the passive branch signal; and
  combining means for combining the passive branch signal and the active branch signal.

25. A fulat tolerant electrical network, comprising:
an electrical line transmitting an electrical data signal; and
repeater nodes, each having an input, an active branch and a passive branch, and each repeater comprising:
  splitting means for splitting the signal to the active and passive branches of said repeater at the input and producing an active branch signal and a passive branch signal at approximately a 71to 29 split ratio where approximately 71% of the energy is routed to the active branch and approximatley 29% of the energy is routed to the passive branch;
  receiving means coupled to said splitting means for receiving the active branch signal transmitted on the active branch and having a high dynamic range;
  retransmit means, coupled to said receiving means, for retransmitting the active branch signal;
  a bypass path, coupled to said splitting means, carrying the passive branch signal; and
  combining means for combining the passive branch signal and the active branch signal.

26. A repeater for splitting the input signal at a predetermined split ratio into an active path signal and a bypass path signal;
  retransmit means for retransmitting the active path signal at the transmit level; and
  combiner means for combining the retransmitted active path signal and the bypass path signal at a predetermined combining ratio where the predetermined split ratio and the predetermined combining ratio produce a bypass ratio of approximately 10.7 dB.

27. A repeater for a fault tolerant data transmission network receiving an input signal at a transmit level, comprising:
  splitting means for splitting the input signal at a predetermined split ratio into an active path signal and a bypass path signal;
  retransmit means for retransmitting the active path signal at the transmit level; and
  combiner means for combining the retransmitted active path signal and the bypass path signal to produce a combined signal at a predetermined combining ratio where the split ratio is such that the bypass path signal at an output of said combiner means is 1/12 of the combined signal.

* * * * *

UNITED STATES PATENT AND TRADEMARK OFFICE
CERTIFICATE OF CORRECTION

PATENT NO. : 5,023,942

DATED : June 11, 1991

INVENTOR(S) : Charles A. Goepel

It is certified that error appears in the above-identified patent and that said Letters Patent is hereby corrected as shown below:

Col. 3, line 66, "LMb 360" should be --LM360--.

Signed and Sealed this

Third Day of November, 1992

*Attest:*

DOUGLAS B. COMER

*Attesting Officer*   *Acting Commissioner of Patents and Trademarks*